United States Patent [19]

Hayashi

[11] Patent Number: 5,799,046
[45] Date of Patent: Aug. 25, 1998

[54] DIGITAL DATA SIGNAL REPRODUCING APPARATUS

[75] Inventor: Hideki Hayashi, Tsurugashima, Japan

[73] Assignee: Pioneer Electric Corporation, Tokyo, Japan

[21] Appl. No.: 590,304

[22] Filed: Jan. 23, 1996

[30] Foreign Application Priority Data

Jan. 23, 1995 [JP] Japan ..................... 7-007877
Dec. 15, 1995 [JP] Japan ..................... 7-327562

[51] Int. Cl.$^6$ ........................................ H03D 1/00
[52] U.S. Cl. ........................... 375/341; 364/724.011
[58] Field of Search ........................ 341/6, 51, 52; 360/18, 32, 40; 369/59, 44.37, 124; 375/229, 232, 341; 364/724.011, 724.19

[56] References Cited

U.S. PATENT DOCUMENTS

| | | |
|---|---|---|
| 4,847,871 | 7/1989 | Matsushita et al. ............ 375/341 |
| 5,291,542 | 3/1994 | Itakura et al. ............... 375/431 |
| 5,424,882 | 6/1995 | Kazawa ....................... 360/46 |
| 5,448,544 | 9/1995 | Tsuchinaga et al. ............ 369/59 |
| 5,581,568 | 12/1996 | Togami ....................... 371/43 |
| 5,619,167 | 4/1997 | Adachi ....................... 329/304 |

Primary Examiner—Stephen Chin
Assistant Examiner—Joseph Roundtree
Attorney, Agent, or Firm—Fish & Richardson P.C.

[57] ABSTRACT

A digital data signal reading and reproducing apparatus which can accurately read and reproduce a digital data signal recorded on a recording medium at a high density. There is performed a Viterbi decoding process in which a code series pattern which the digital data signal can take is subjected to the convolution arithmetic calculation by means of discrete impulse responses h(i) obtained by performing the discrete inverse Fourier transformation on the frequency characteristics of a signal recording and reproducing system constructed by the recording medium and its reading device and the results of the convolution arithmetic calculation are made to be the predicted values.

8 Claims, 9 Drawing Sheets

DIGITAL DATA SIGNAL REPRODUCING APPARATUS

BACKGROUND OF THE INVENTION

1. Field of the Invention

The present invention relates to a reproducing apparatus of a digital signal transmitted through a signal transmitting system such as a recording and reproducing system or the like and, more particularly, to a digital data signal reproducing apparatus including a Viterbi decoding apparatus.

2. Description of the Related Art

A Viterbi decoding system is known as a system whereby a digital data signal which has been subjected to an inter-code interference through a signal transmitting system is reconstructed with high reliability. In the Viterbi decoding system, the digital data signal can be reconstructed at a low error rate even when the inter-code interference in the reproduction signal transmitted through the signal transmitting system is large or an S/N ratio is low.

In the Viterbi decoding system, a sample value obtained by sampling a reception signal which is supplied through the signal transmitting system is converted to a digital code signal of, for example, eight bits. Square errors between the reception sample value data and a plurality of predetermined predicted value data are accumulated and added. A data pattern series is made to be reproduced digital data while selecting a path such that an accumulated addition value is minimized.

When the foregoing predicted values are determined, it is assumed that the signal transmitting system has the so called partial response characteristics. By combining the Viterbi decoding system to a circuit having the partial response characteristics, a PRML (Partial Response Maximum Likelihood) system has been developed and already been put into practical use.

As for the PRML system, a detail explanatory article is published in the magazine of "Nikkei Electronics", pages 71 to 97, published on Jan. 17, 1994.

In the above well-known PRML system, however, there is also a case where ideal frequency characteristics of a signal transmission line which are presumed are not always adapted to frequency characteristics of an actual recording and reproducing system. For example, in the recording and reproducing system in which an optical disk is used as a recording medium, it has been found that when a recording density to the optical disk is raised, a transmission clock frequency is higher as compared with a frequency band of the recording and reproducing system, so that transmission characteristics of the recording and reproducing system are away from ideal transmission characteristics which are set as a prerequisite by the PRML system. For example, in case where a (1, 7) RLL (Run Length Limited) code or a (2, 7) RLL code is used as a modulation code, the transmission clock frequencies are raised to values that are 1.5 times or 2 times as high as that in the case of non-modulation, so that a difference between the ideal transmission characteristics and the actual transmission characteristics increases more and more, whereby it is difficult to accurately reconstruct digital data.

OBJECT AND SUMMARY OF THE INVENTION

It is, therefore, an object of the present invention to provide a reading and reproducing apparatus of a digital data signal which reads a digital data signal recorded on a recording medium to, thereby obtain a correct reproduction digital data signal even in case when the density of the recording medium is high.

According to the present invention, a reading and reproducing apparatus of a digital recording data signal comprises: a reading apparatus for reading a recorded original digital data signal from a recording medium carrying thereon the original digital data signal, thereby forming a read signal; an A/D converter for sampling the read signal every unit digit time duration, thereby forming sample values; square error detecting means for obtaining square errors between the sample values and a plurality of predetermined predicted sample values; and pattern selecting means for selecting data pattern series to a reproduced digital data pattern such that an accumulated addition value of the square errors obtained by the square error detecting means is minimum, wherein when it is assumed that said original digital data signal can take a code series pattern which is represented by $\underline{ak} = [a(k), a(k+1), \ldots, a(k+n)]$ (both of k and n are natural numbers) and the predicted values $y(\underline{ak})$ in correspondence to $\underline{ak}$, is expressed by the following equation:

$$y(\underline{ak}) = \sum_{i=0}^{n} h(i)a(k + n - i)$$

where, $h(i)$ denotes tap coefficients of a digital filter which are obtained by discrete inverse Fourier transforming frequency characteristics of a recording and reproducing system constructed by the recording medium and the reading device.

In the digital data signal reading and reproducing apparatus according to the present invention with the above construction, the Viterbi decoding process is performed by the predicted values obtained by accurately reflecting the frequency characteristics of the recording and reproducing system including the recording medium and the reading device for reading the recording digital data signal from the recording medium.

DETAILED DESCRIPTION OF THE PREFERRED EMBODIMENTS

Figure 1:
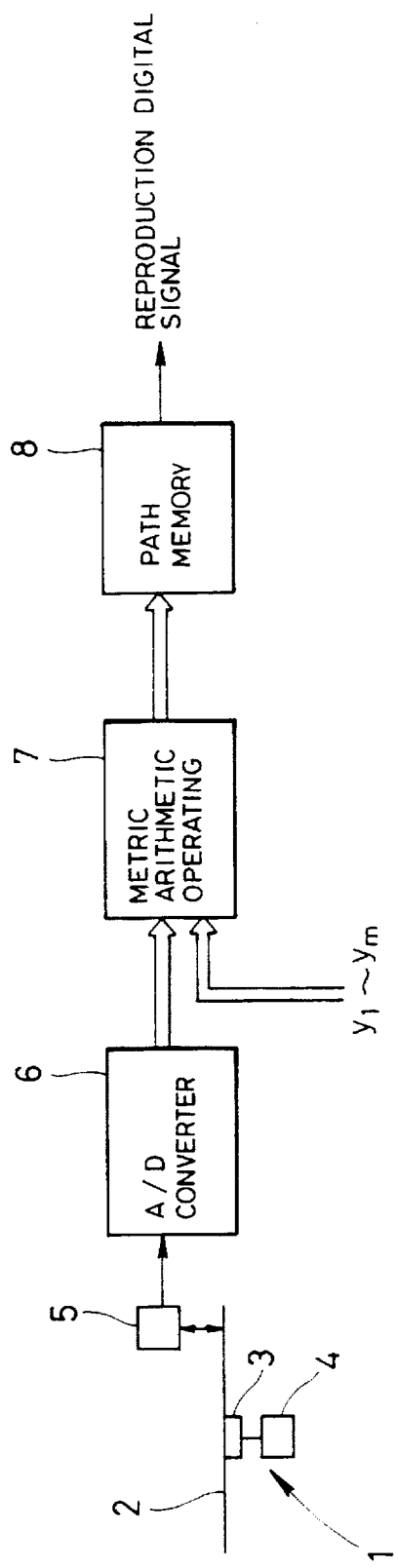
FIG. 1 is a block diagram showing a digital data signal reading and reproducing apparatus according to the present invention.

FIG. 1 shows a digital data signal reading and reproducing apparatus according to the present invention. In the apparatus, a reading device 1 comprises: a turntable 3 for rotatably supporting an optical disk 2 of a recording medium; a rotation driving unit 4 for rotating the turntable 3 at a desired rotational speed; and a pickup 5 for irradiating a reading beam onto a recording surface of the optical disk 2, thereby forming a reading spot, and for generating an electric signal, as a read signal, whose level is changed in accordance with a pit train on the recording surface of the optical disk on the basis of a phase change of a reflected beam from the reading spot.

The read signal is supplied as an analog signal to an A/D converter 6. The A/D converter 6 samples the supplied read signal and generates a series of sample values SP(k) (k denotes a natural number).

A series of sample values obtained as mentioned above are supplied to a metric arithmetic operation circuit 7. The metric arithmetic operation circuit 7 performs a square error arithmetic operation between the supplied series of sample values and the predicted values y1 to ym (m denotes a natural number), accumulates and adds the arithmetic operation results, and supplies a path selection signal for selecting a path causing the accumulated addition value to be minimized to a path memory 8. The path memory 8 outputs "0" or "1" in accordance with the path selection signal, thereby reconstructing a reproduction digital data signal.

Figure 2:
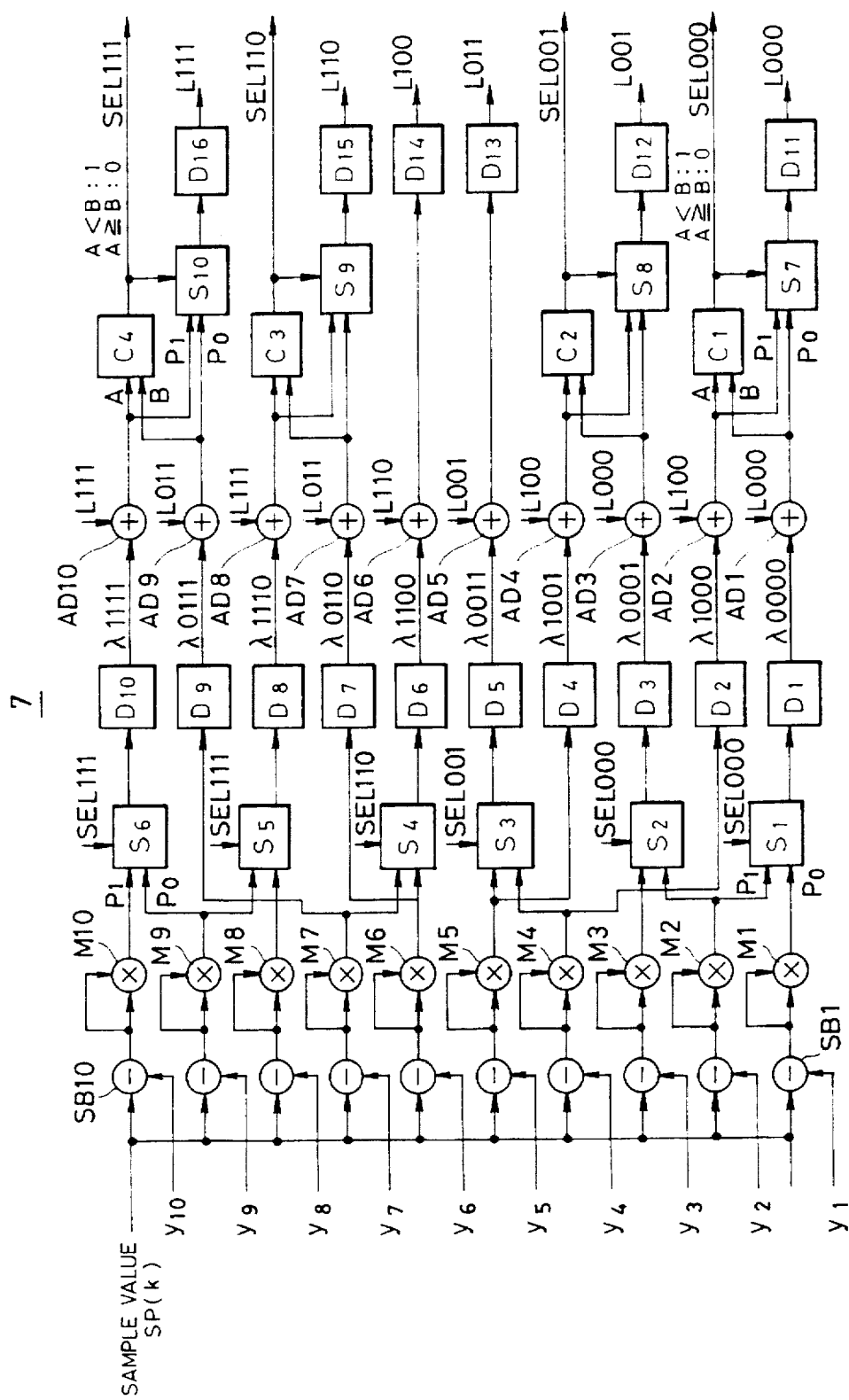
FIG. 2 is a circuit diagram showing a specific example of a metric arithmetic operation circuit in the apparatus of FIG. 1.

FIG. 2 shows a specific circuit example of the metric arithmetic operation circuit 7. This is a circuit example for decoding a (1, 7) RLL code, which will be described hereinafter. The predicted values y1 to y10 are shown in a Table 1, which will be explained hereinafter. The series of sample values from the A/D converter 6 are supplied to one input of each of subtractors SB1 to SB10. The subtractors SB1 to SB10 respectively produce differences between the predicted values y1 to y10 and the sample value SP(k) and supply the differences to corresponding square circuits M1 to M10. Values $\{y1-SP(k)\}^2$, $\{y2-SP(k)\}^2$, ..., $\{y10-SP(k)\}^2$ are, therefore, generated synchronously with a sampling timing of the A/D converter 6 from the square circuits M to M10 every sample value.

When receiving a path selection signal SEL000 which is equal to "0", a selecting circuit S1 relays an input signal of an input terminal P0, namely, an output of the square circuit M1 to the next stage. When the path selection signal SEL000 is equal to "1", the selecting circuit S1 relays an input signal of an input terminal P1, namely, an output of the square circuit M2 to the next stage. The input terminals on the lower side and the upper side in the diagram of selecting circuits S2 to S10 are P0 and P1 terminals, respectively. Each of the selecting circuits S2 to S10 relays an input of the P0 terminal to the next stage when receiving a path selection signal which is equal to "0". Each selecting circuit relays an input of the P1 terminal to the next stage when the path selection signal is equal to "1".

A D-register D1 generates a relayed output of S1 as a branch metric signal λ0000 synchronously with a clock timing. A D-register D2 similarly generates an output of M4 as a branch metric signal λ1000 synchronously with a clock timing. Similarly, D-registers D3 to D10 issue outputs of S2, M5, S3, S4, M6, S5, M7, and S6 as branch metric signals λ10001, λ1001, λ0011, λ1100, λ0110, λ1110, λ0111, and λ1111 synchronously with a clock timing respectively. The subtractors SB1 to SB10, square circuits M1 to M10, selecting circuits S to S6, and D-registers D1 to D10, therefore, construct a branch metric arithmetic operation circuit.

The branch metric signals λ0000 to λ1111 obtained as mentioned above are sequentially accumulated and added to path-metric signals L000, L100, L010, L100, L001, L110, L011, L111, L011, and L111 in adders AD1 to AD10. The path-metric signals will be described hereinafter.

A comparator C1 compares magnitudes of the accumulation values from the adders AD1 and AD2 so as to make the path selection signal SEL000 to be "0" when an A input level is not smaller than a B input level or to make the path selection signal SEL000 to be "1" when the A input level is smaller than the B input level. Hereinbelow, an input of each of comparators C2 to C4 on the lower side in the diagram denotes a B input and an input on the upper side indicates an A input. In a manner similar to the comparator C1, when A≧B, outputs of the comparators C2 to C4 are set to be "0" and, when A <B, they are set to be "1".

Outputs of the selecting circuits S7 to S10 and outputs of the adders AD5 and AD6 are supplied to the adders [AD1, AD3; AD5; AD7, AD9; AD2, AD4; AD6; ADB, AD10] as path metric signals L000, L001, L011, L100, L110, and L111 through D-registers D11 to D16. The adders AD1 to AD10, comparators C1 to C4, selecting circuits S7 to S10, and D-registers D11 to D16, therefore, construct a path metric arithmetic operation circuit.

Figure 3:
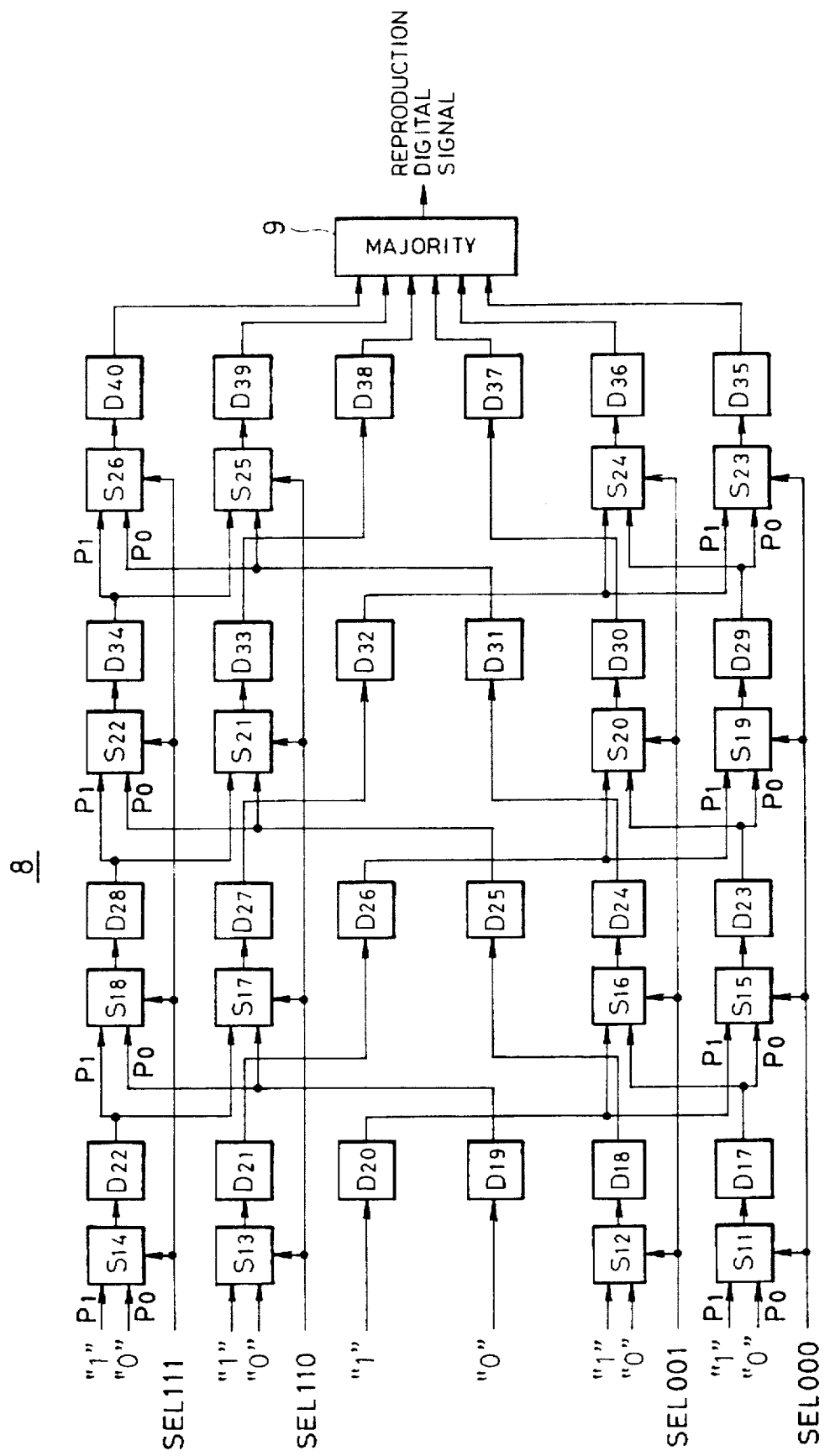
FIG. 3 is a circuit diagram showing a specific example of a portion of a path memory in the apparatus of FIG. 1.

FIG. 3 shows a specific example of the path memory 8. The path memory 8 sequentially generates "0" or "1"in accordance with the values of the path selection signals SEL000, SEL001, SEL110, and SEL111, thereby reconstructing the reproduction digital data signal.

When receiving the logic values of the path selection signals SEL000, SEL001, SEL110, and SEL111 which are equal to "0", selecting circuits S11 to S26 of the path memory 8 respectively relay the input signals transmitted through the input terminals P0 on the lower side in the diagram. When receiving the logic value which is equal to "1", the selecting circuits S11 to S26 respectively relay the input signals transmitted through the input terminals P1 on the upper side. Each of D flip-flops D17 to D40 holds data supplied thereto for only one clock period of time, thereby causing a delay. A majority decision circuit 9 generates a logic value "0" or "1" which is major among the logic values generated from the D flip-flop D35 to D40, thereby forming the reproduction digital data signal.

Although the foregoing path memory 8 has a form having a memory length of four bits, it is considered to be more practical to use a form having a memory length of 20 to 200 bits. When the memory length is set to be longer, such a probability rises that all of the data at the final stage coincide to each other, thereby dispensing with the majority decision circuit 9.

The metric arithmetic operation circuit 7 and path memory 8 constructed by the branch metric arithmetic operation circuit and the path metric arithmetic operation circuit mentioned above execute a Viterbi decoding process on the reception data series by means of the given predicted values y1 to y10. It is obvious to those skilled in the art that various kinds of circuit forms for performing the Viterbi decoding process can be used as far as the predicted values are given.

The optical disk 2 in the reading apparatus 1 may be a CD size of optical disk of carrying thereon a video signal of about two hours which is compressed and modulated by, for example, what is called an MPEG method and, after that, is recorded at a data rate of 7.5 Mbps. It is assumed that a numerical aperture NA of an objective lens of the pickup 5 is set to, for example, 0.55, a wavelength λ of a reading beam which is emitted from the pickup 5 is set to, for example, 635 nm. When the disk 2 is rotated by the turntable 3 and a reading spot by the pickup 5 traces a track of the disk and a digital data signal is read out from the track, a linear velocity v of the reading spot on the track is, for example, a constant value of 1.5 m/sec.

A function M(f) which represents an MTF (Modulation Transfer Function) of signal transfer characteristics of the reading apparatus 1 is expressed by the following equation.

$$M(f) = (\gamma - \sin\gamma)/\pi \quad f \leq fc$$
$$= 0 \quad f > fc$$

where, λ=2arccos(f/fc)

fc=2NA·v/λ

In the equation, fc denotes a cut-off frequency and indicates an upper limit frequency of the frequency characteristics of the reading apparatus 1.

When applying NA=0.55, λ=635 nm, and v=1.5 m/sec to the particular equation, fc=2.60 MHz is derived.

Figure 4:
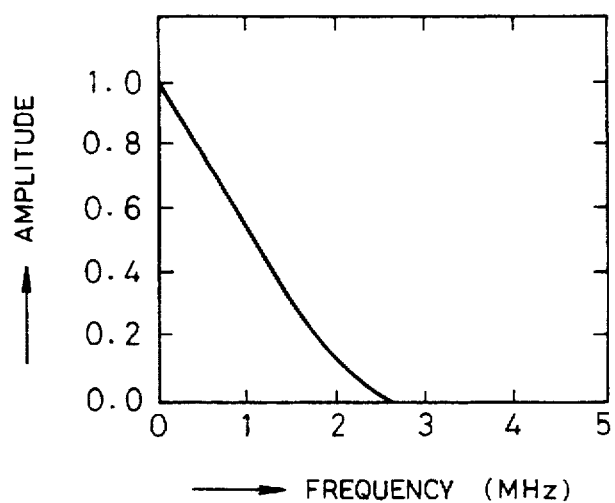
FIG. 4 is a graph showing MTF characteristics of a reading and reproducing system for a recording signal.

M(f) expressed by the above equation is depicted in FIG. 4.

In the digital data signal reading and reproducing apparatus according to the present invention, the tap coefficients of the digital filter for approximating the frequency characteristics of the recording and reproducing system including the recording medium and the reading device undergo the convolution arithmetic operation with each bit of the data pattern of a predetermined bit length so that the results thereof are made to be the predicted values y1 to y10.

The digital filter for approximating the frequency characteristics depicted in FIG. 4 will now be described hereinbelow.

It is assumed that a clock frequency fs of the read digital data signal is equal to 7.5 MHz and a sampling number N of a discrete Fourier transformation is set to N=8. Although the sampling number N can be arbitrarily selected, the sampling number N may be selected to be equal to the power of 2, in view of convenience for an arithmetical operation of the Fourier transformation.

By sampling the frequency characteristics shown in FIG. 4 within a frequency band of 0 to fs/2 at frequency intervals of fs/N=0.94 MHz, namely, at frequencies of 0, fs/8, fs/4, 3fs/8, and fs/2, the following discrete spectra H(0) to H(4) are obtained.

H(0)=1.00000

H(1)=0.55079

H(2)=0.16879

H(3)=0.00000

H(4)=0.00000

Figure 5A:
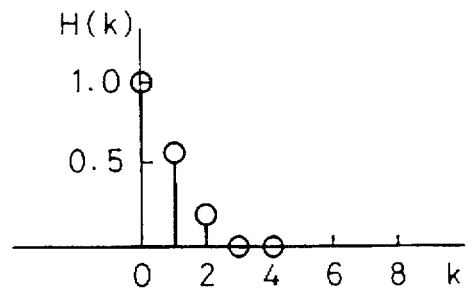
FIGS. 5A to 5D are diagrams each showing a step of discrete inverse Fourier transforming frequency characteristics of the recording and reproducing system.

The spectra of H(0) to H(4) are distributed in such a manner as shown in FIG. 5A. Among H(0) to H(4), by symmetrically folding H(1) to H(3) with respect to H(4), the following discrete spectra H(0) to H(7) are obtained.

H(0)=1.00000

H(1)=0.55079

H(2)=0.16879

H(3)=0.00000

H(4)=0.00000

H(5)=0.00000

H(6)=0.16879

H(7)=0.55079

Figure 5B:
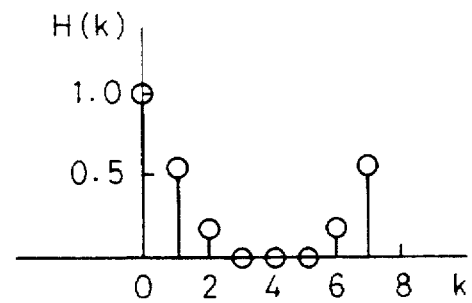

As for H(5) to H(7), it can be considered that the spectra H(−3) to H(−1) at negative frequencies are repeated at a period of N=8 by a periodicity of the discrete Fourier transformation. A distribution manner of H(0) to H(7) is shown in FIG. 5B.

When the discrete spectra H(0) to H(7) are subjected to the discrete inverse Fourier transformation, the following discrete impulse responses h(0) to h(7) are obtained.

h(0)=0.30489 h(1)=0.22237 h(2)=0.08280 h(3)=0.02763 h(4)=0.02950 h(5)=0.02763 h(6)=0.08280 h(7)=0.22237

Figure 5C:
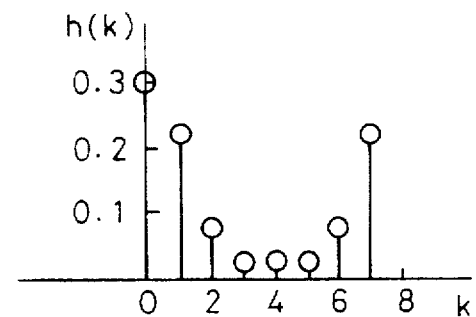

A distribution manner of the discrete impulse responses h(0) to h(7) is shown in FIG. 5C. It is assumed that h(3) to h(5) are ignored in consideration of a circuit scale of a Viterbi decoding circuit. By a periodicity of the discrete Fourier transformation, h(6) to h(7) are set to h(−2) to h(−1) and are shifted by only the period of N =8, so that the following discrete impulse responses are obtained.

h(−2)=0.08280 h(−1)=0.22237 h (0)=0.30489 h (1)=0.22237 h (2)=0.08280

Figure 5D:
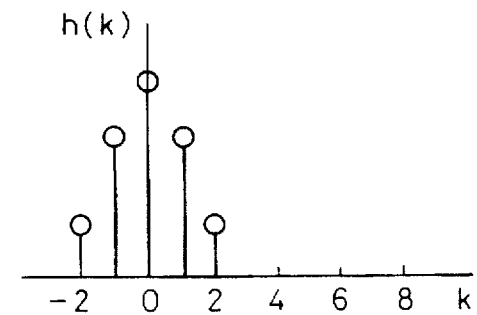
Figure 6:
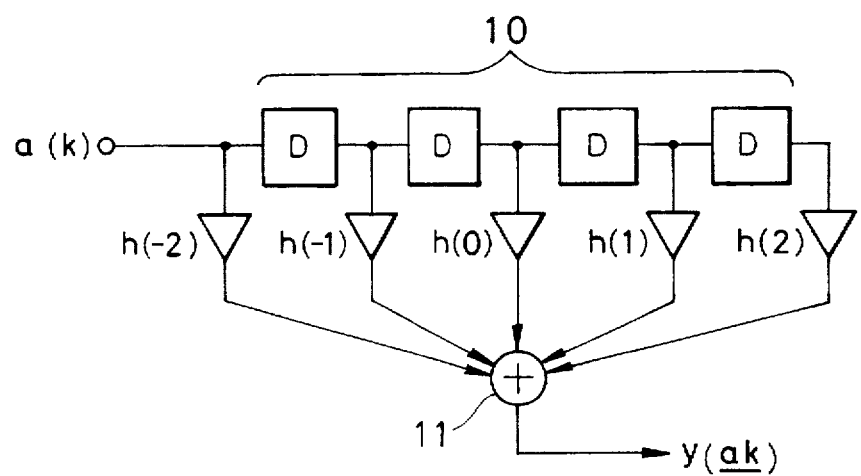
FIG. 6 is a circuit diagram showing a digital filter approximating frequency characteristics of the recording and reproducing system.
Figure 7:
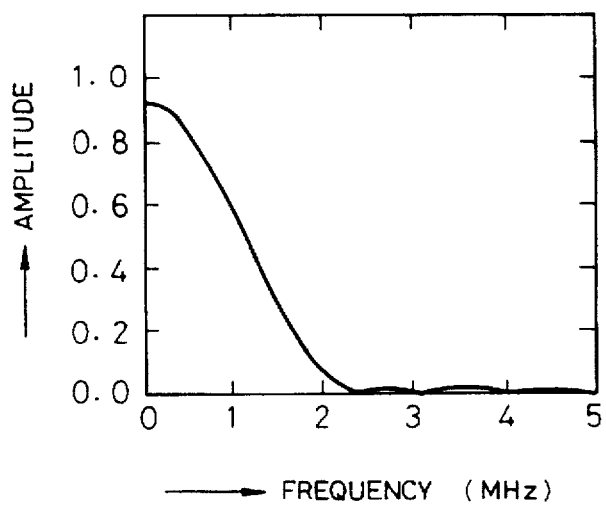
FIG. 7 is a graph showing frequency characteristics of the digital filter of FIG. 6.

FIG. 5D shows a distribution manner of the discrete impulse responses h(−2) to h(2). A digital filter with the tap coefficients respectively equal to the discrete impulse responses h(−2) to h(2) obtained as mentioned above is so constructed as shown in FIG. 6 and has a frequency characteristics approximating the frequency characteristics of the recording and reproducing system constructed by the reading apparatus 1 and recording medium 2. FIG. 7 shows frequency characteristics of the digital filter obtained as mentioned above. As will be obviously understood by comparing the characteristics in FIGS. 7 and 4, it is found that the characteristics in FIG. 7 are fairly approximate to the characteristics in FIG. 4. When, in the filter of FIG. 6, input digital data a(k) (k is the natural number) are supplied, the tap coefficients h(2), h(1), h(0), h(−1), and h(−2) are multiplied to digital data a(k−2), a(k−1), a(k), a(k+1), and a(k+2) which sequentially passed through a group of D flip-flops 10 that are connected in the form of the cascade connection. The results are added by an adder 11 and the resultant data are generated as y(ak), as follows:

$$y(\underline{ak}) = \sum_{i=-2}^{2} h(i)a(k-i)$$

In other words, the predicted values y(ak) are resulted from arithmetic operations causing the convolution arithmetic calculations on the respective input digital data pattern a(k) and the discrete impulse response h(i).

When a voltage of +1 volt is made to correspond to a logic "1" bit in the input data series a(k) and a voltage of −1 volt is made to correspond to a logic "0" bit, so long as the input data series a(k) is equal to {1, 1, 0, 0, 1}, $$y(11001) = h(-2) - h(-1) - h(0) + h(1) + h(2)$$
$$= 0.13929 \text{ volt}$$

Assuming that a recording digital data signal denotes the (1, 7) RLL code, a data pattern such as {1, 0, 1, 0, 1} or the like such that a run length is equal to 1 cannot exist as a(k), under the NRZ rule. When, therefore, the convolution arithmetic calculation with respect to data patterns of y(a(−2), a(−1), a(0), a(1), a(2)) in which the above data patterns are eliminated, values of the predicted values y respectively corresponding to data patterns each having a length of five bits can be obtained as follows.

TABLE 1

| | | | | | | |
|---|---|---|---|---|---|---|
| y(11111) | = | | | .91524 | ... | y10 |
| y(11110) | = | y(01111) | = | .74963 | ... | y9 |
| y(01110) | = | | | .58402 | ... | y8 |
| y(11100) | = | y(00111) | = | .30489 | ... | y7 |
| y(00110) | = | y(01100) | = | .13929 | ... | y6 |
| y(11001) | = | y(10011) | = | −.13929 | ... | y5 |
| y(11000) | = | y(00011) | = | −.30489 | ... | y4 |
| y(10001) | = | | | −.58402 | ... | y3 |
| y(10000) | = | y(00001) | = | −.74963 | ... | y2 |
| y(00000) | = | | | −.91524 | ... | y1 |

It is now to be understood that the minimum inversion interval of recorded digital data signal is equal to a period of two symbols when the recording digital data signal has been coded under the (1, 7) RLL rule. When it is a (2, 7) RLL code, its minimum inversion interval is a period of three symbols.

Figure 8:
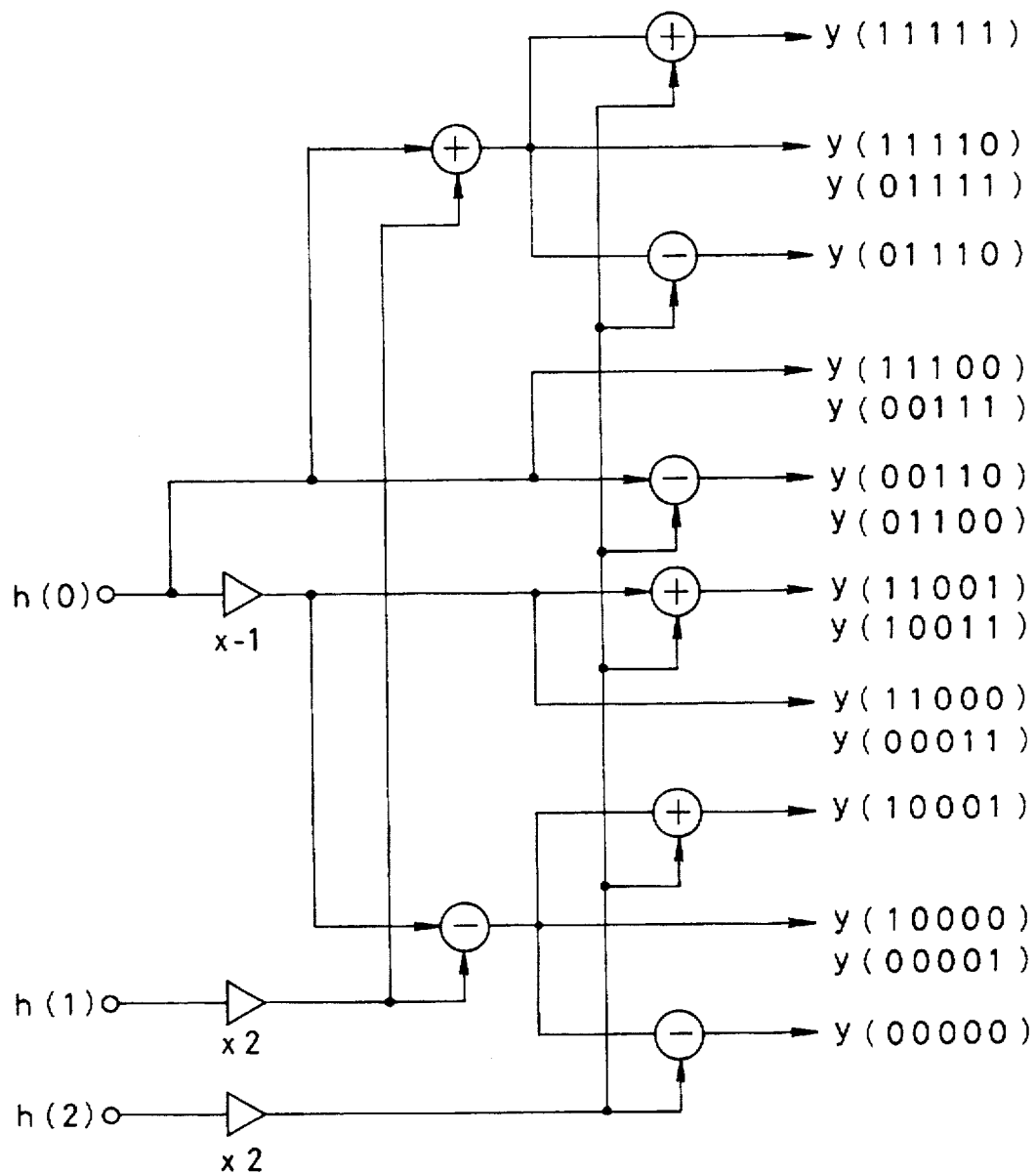
FIG. 8 is a circuit diagram showing a circuit example to calculate predicted values in accordance with the invention.

FIG. 8 shows a logic circuit to calculate the predicted values y($\underline{ak}$).

In the embodiment mentioned above, the digital filter of an odd-number degree has been used. A digital filter of an even-number degree can be also used. The digital filter of an even-number degree which approximates the frequency characteristics depicted in FIG. 4 will now be explained hereinbelow.

In this case, it is assumed that 2fs=15 [MHz] and M=16 and the values which are two times as large as those are used in the filter of an odd-number degree.

By first sampling the frequency characteristics in FIG. 4 at frequency intervals of 2fs/M=0.94[MHz] within a frequency band of 0 to fs, the following discrete spectra H(0) to H(8) are obtained.

H(0)=1.00000
H(1)=0.55079
H(2)=0.16879
H(3)=0.00000
H(4)=0.00000
H(5)=0.00000
H(6)=0.00000
H(7)=0.00000
H(8)=0.00000

Figure 9A:
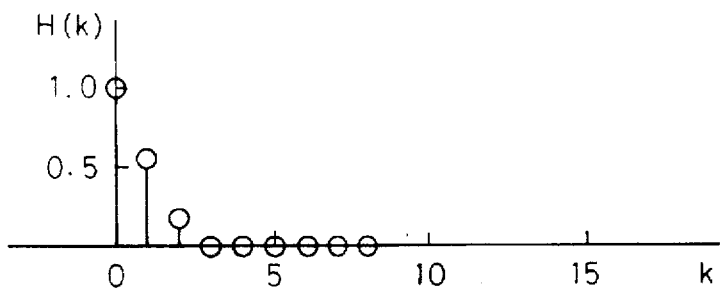
FIGS. 9A to 9D are diagrams each showing a step of calculating tap coefficients of even-number orders in a digital filter according to the invention.

FIG. 9A shows a distribution manner of H(0) to H(8).

The discrete spectra H(1) to H(7) are symmetrically folded with respect to H(8), so that the following discrete spectra H(0) to H(15) are derived.

H(0)=1.00000
H(1)=0.55079
H(2)=0.16879
H(3)=0.00000
H(4)=0.00000
H(5)=0.00000
H(6)=0.00000
H(7)=0.00000
H(8)=0.00000
H(9)=0.00000
H(10)=0.00000
H(11)=0.00000
H(12)=0.00000
H(13)=0.00000
H(14)=0.16879
H(15)=0.55079

Figure 9B:
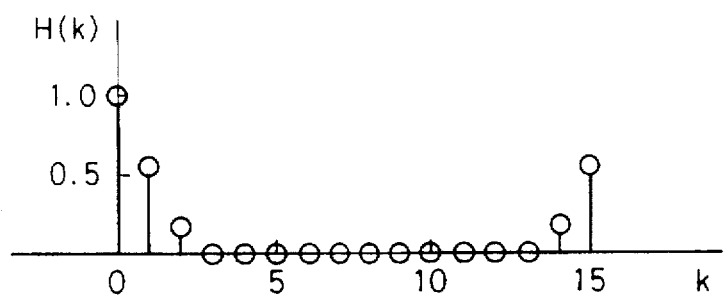

FIG. 9B shows a distribution manner of the foregoing H(0) to H(15).

Assuming that H(0) to H(15) are subjected to the discrete inverse Fourier transformation, the following discrete impulse responses h(0) to h(15) are obtained.

h(0)=0.15245
h(1)=0.14103
h(2)=0.11118
h(3)=0.07393
h(4)=0.04140
h(5)=0.02123
h(6)=0.01382
h(7)=0.01381
h(8)=0.01475
h(9)=0.01381
h(10)=0.01382
h(11)=0.02123
h(12)=0.04140
h(13)=0.07393
h(14)=0.11118
h(15)=0.14103

Figure 9C:
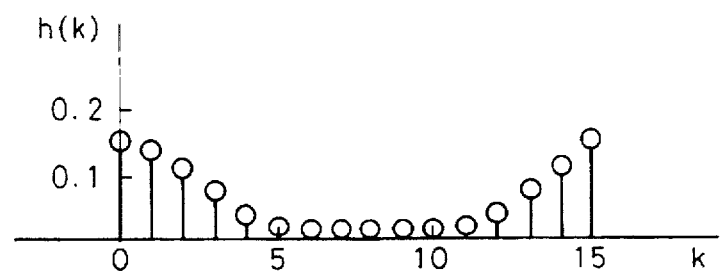

FIG. 9C shows a distribution manner of h(0) to h(15).

The discrete impulse responses h(0) to h(15) excluding h(0) to h(3) are neglected and h(1) and h(3) are extracted. Values of h(1) and h(3) are doubled and folded, thereby obtaining g(−1) to g(2). That is, (−1)=2·h(3)=0.14786
(0)=2·h(1)=0.28205
(1)=2·h(1)=0.28205
(2)=2·h(3)=0.14786

Figure 9D:
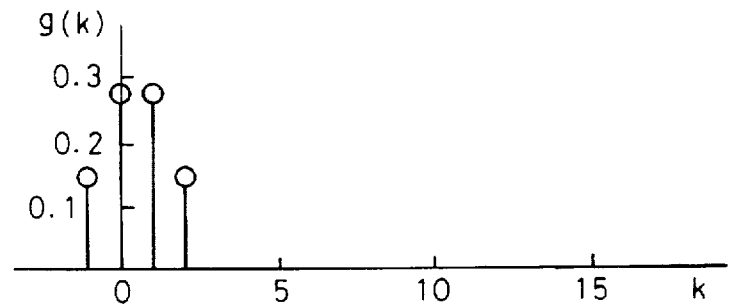

FIG. 9D shows a distribution manner of g(−1) to g(2).

Since the spectra obtained by doubling fs are Fourier inverse transformed, the clock period of each of the impulse responses h(0) to h(15) is equal to ½ of an actual transmission clock period. When obtaining g(−1) to g(2), by thinning out every other coefficient, the discrete impulse responses in the actual transmission clock period are obtained. In order to compensate the decrease in gain due to the thinning-out process, a constant "2" is multiplied to each tap coefficient.

Figure 10:
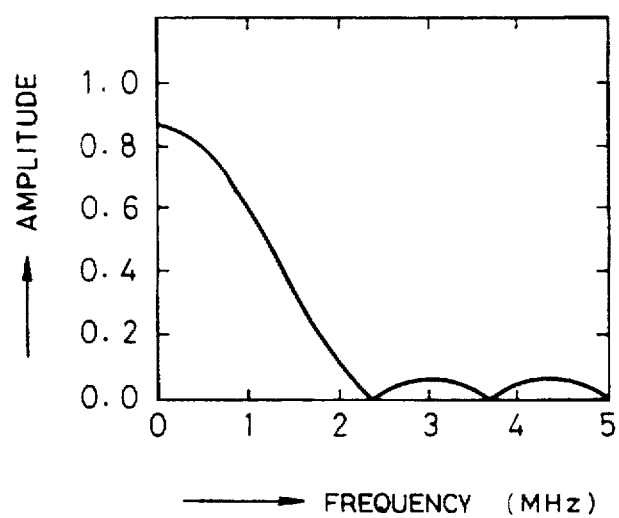
FIG. 10 is a graph showing transmission characteristics of the digital filter using tap coefficients obtained by the calculating steps shown in FIGS. 9A to 9D.

The digital filter having the tap coefficients such as g(−1) to g(2) is designed as mentioned above. FIG. 10 shows its frequency characteristics.

By comparing FIGS. 10 and 4, it will be understood that the frequency characteristics in this embodiment are also fairly approximated to those of the actual recording and reproducing system.

Even though the digital filters have four taps and five taps, respectively, the degree of the digital filter can be selected in consideration of a hardware scale and a decoding performance of the Viterbi decoder.

In this instance, the well-known PRML method and the tap coefficients of the digital filter for calculation of the predicted values according to the invention will now be compared. In case of four taps, the foregoing coefficients g(−1) to g(2) are respectively equal to values of 0.14786, 0.28205, 0.28205, 0.14786. When the coefficients at both ends are respectively normalized to 1, values of 1, 1.9075, 1.9075, 1 are derived. By comparing the foregoing coefficients with coefficients (1, 3, 3, 1) of a PR (1, 3, 3, 1) method which is expressed by $(1+D)^3$, it will be understood that the coefficients are smaller in the middle portion of the predicted values according to the invention.

In case of the digital filter of five taps, similarly, values of the coefficients h(−2) to h(2) are equal to (0.08280, 0.22237, 0.30489, 0.22237, 0.08280). Coefficients in the middle portion of (1, 2.6856, 3.6822, 2.6856, 1) obtained by normalizing the coefficients of h(−2) to h(2) are smaller than those of (1, 4, 6, 4, 1) expressed by $(1+D)^4$.

Generally, by a binomial theorem, the following equation is obtained.

$$(1+x)^n = \sum_{k=0}^{n} nC_k \cdot x^k$$

$$= 1 + nC_1 \cdot x + nC_2 X^2$$

$$\ldots + nC_{n-1} x^{n-1} + x^n$$

where, each coefficient of a polynomial regarding X is called a binomial coefficient and is shown by nCk. The coefficients at both ends in the equation, namely, the coefficients of $X^0$ and $X^n$ are equal to 1.

In the well-known PRML method, digital filter coefficients are given by the binomial coefficients. It can be said that in case of coefficients of the digital filter which is adapted to a system of a higher density according to the present invention, and they are so normalized that the coefficients at the both ends become 1, each coefficient in the middle between the both ends has a value which is smaller than the binomial coefficient.

If a waveform equalizing circuit is provided in the reading apparatus, it is sufficient that on the basis of the frequency characteristics of the whole recording and reproducing system including the waveform equalizing circuit, are to be subjected to the discrete inverse Fourier transformation and a digital filter for calculation of the predicted values is designed.

In case of performing a high density recording and reproduction using, for example, a magnetic super resolving effect by a magneto-optical disk of a multi-layer film construction, it is necessary to consider not only amplitude characteristics but also phase characteristics with respect to the frequency characteristics of the recording and reproducing system. In this instance, it is sufficient that the frequency characteristics are given by complex numbers which are subjected to the discrete inverse Fourier transformation so as to design a digital filter for calculation of the prediction values.

The tap coefficients and predicted values of the digital filter so designed as mentioned above have been expressed in decimal. In the realization of an actual hardware, however, it is possible to approximate by properly omitting numerical values below a certain digit or the like.

Properties inherent to the predicted values determined in accordance with the invention will now be described hereinbelow.

In case of a code such as a (1, 7) RLL code is used in which the minimum inversion interval is a period of two symbols, the predicted values for the PR(1, 1), PR(1, 2, 1), and PR(1, 3, 3, 1) systems are shown in the following Tables 3, 4, and 5. The predicted values according to the invention are, on the other hand, shown in Tables 1 and 2.

TABLE 2

| y(1111) | = |         |   | .85982  |
|---------|---|---------|---|---------|
| y(1110) | = | y(0111) | = | .56411  |
| y(0110) | = |         |   | .26839  |
| y(1100) | = | y(0011) | = | .00000  |
| y(1001) | = |         |   | −.26839 |
| y(1000) | = | y(0001) | = | −.56411 |
| y(0000) | = |         |   | −.85982 |

TABLE 3

| y(11) | = |       |   | 2  |
|-------|---|-------|---|----|
| y(10) | = | y(01) | = | 0  |
| y(00) | = |       |   | −2 |

TABLE 4

| y(111) | = |        |   | 4  |
|--------|---|--------|---|----|
| y(110) | = | y(011) | = | 2  |
| y(100) | = | y(001) | = | −2 |
| y(000) | = |        |   | −4 |

TABLE 5

| y(1111) | = |         |   | 8  |
|---------|---|---------|---|----|
| y(1110) | = | y(0111) | = | 6  |
| y(0110) | = |         |   | 4  |
| y(1100) | = | y(0011) | = | 0  |
| y(1001) | = |         |   | −4 |
| y(1000) | = | y(0001) | = | −6 |
| y(0000) | = |         |   | −8 |

It is assumed that the minimum absolute value among the predicted values excluding 0 is expressed by |Ymin| and the maximum absolute value is expressed by |Ymax|. A consideration will now be made with respect to a ratio |Ymin|/|Ymax|. The ratios of |Ymin|/|Ymax| in the well-known PRML system have values of ½ or larger as follows.

2/2=1
2/4=½
4/8=½

With respect to the predicted values in the digital data signal reading and reproducing system according to the present invention, the particular ratios have values less than ½ as follows.

0.13929/0.91524=0.15219
0.26839/0.85982=0.31215

It will be understood that the filter is more preferably adapted by reducing |Ymin|/|Ymax| as a recording density in the recording and reproducing system rises. In this instance, |Ymin| denotes the absolute value of the predicted value corresponding to an aperture portion of an eye pattern and |Ymax| denotes the absolute value of the predicted value corresponding to an envelope of the eye pattern. As is well known by experience, as a density of the system rises, the aperture portion of the eye pattern decreases, so that an amplitude ratio between the aperture portion and the envelope, namely, what is called an eye aperture efficiency also decreases. |Ymin|/|Ymax| denotes a numerical value corresponding to the eye aperture efficiency. That is, in the Viterbi decoding, a predicting precision is improved by reducing |Ymin|/|Ymax| as a density of the system increases, so that an error rate of the decoding data can be preferably held.

In the case where the original digital data signal has been coded by a code such as (2, 7) code or EFM code whose minimum inversion interval is equal to a period of three symbols, the predicted values in the PR (1, 2, 1) and PR (1, 3, 3, 1) methods have such values as shown in the following Tables 6 and 7. When the predicted values according to the present invention are calculated by using the foregoing method, they have such values as shown in Tables 8 and 9. In this instance, it has been assumed that the original digital data signal has been coded by the (2, 7) code and that the data rate after completion of the modulation has been 10.0 Mbps. In Tables 6 and 8, the frequency characteristics of the recording and reproducing system are approximated by a digital filter of three taps and each Table is constructed by four predicted values. In Tables 7 and 9, the frequency characteristics of the recording and reproducing system are approximated by a digital filter of four taps and each Table is constructed by five predicted values.

TABLE 6

| y(111) | = |        |   | 4  |
|--------|---|--------|---|----|
| y(110) | = | y(011) | = | 2  |
| y(100) | = | y(001) | = | −2 |
| y(000) | = |        |   | −4 |

TABLE 7

| y(1111) | = |         |   | 8  |
|---------|---|---------|---|----|
| y(1110) | = | y(0111) | = | 6  |
| y(1100) | = | y(0011) | = | 0  |
| y(1000) | = | y(0001) | = | −6 |
| y(0000) | = |         | = | −8 |

TABLE 8

| y(111) | = |        |   | .62587  |
|--------|---|--------|---|---------|
| y(110) | = | y(011) | = | .23020  |
| y(100) | = | y(001) | = | −.23020 |
| y(000) | = |        |   | −.62587 |

TABLE 9

| y(1111) | = |         |   | .76916  |
|---------|---|---------|---|---------|
| y(1110) | = | y(0111) | = | .44344  |
| y(1100) | = | y(0011) | = | .00000  |
| y(1000) | = | y(0001) | = | −.44344 |
| y(0000) | = |         |   | −.76916 |

In this instance, it is to be noted that |Ymin|/|Ymax| in the PR (1, 2, 1) method is equal to $\frac{2}{4}=\frac{1}{2}$. Whereas, |Ymin|/|Ymax| has a value of ½ or less in the system according to the present invention as follows:

0.23020/0.62587=0.36781

Further, |Ymin|/|Ymax| in the PR (1, 3, 3, 1) method is equal to $\frac{6}{8}=\frac{3}{4}$. In the system according to the present invention, |Ymin|/|Ymax| has a value which is smaller than ¾, as follows:

0.44344/0.76916=0.57653 By setting |Ymin|/|Ymax| to a value which is smaller than that in case of the PRML method, the Viterbi decoder suitable for the system for reproducing a recorded digital signal at a high density can be obtained in accordance with the present invention.

In case of using a code such as NRZ code or 8/10 code whose minimum inversion interval is equal to a period of one symbol, |Ymin|/|Ymax| in each of the PR (1, 1), PR (1, 2, 1), and PR (1, 3, 3, 1) methods is equal to or larger than ¼. According to the invention, by setting |Ymin|/|Ymax| to a value smaller than ¼, a Viterbi decoder suitable for the system for reproducing a recorded digital signal at a high density can be obtained.

As will be obviously understood from the above description, since, in the digital data signal reading and reproducing apparatus according to the invention, the Viterbi decoding process is performed by the predicted values which accurately reflect to the signal transmission characteristics of the recording and reproducing system including the recording medium and the reading device for reading the digital data signal from the recording medium, a correct reproduction digital data signal can be obtained even when a recording density to the recording medium is so high.

What is claimed is:

1. A reading and reproducing apparatus for producing reproduction digital data series corresponding to the original digital data signal recorded on a recording medium while using a Viterbi decoding method, comprising:

a reading device for reading said original digital data signal from said recording medium, thereby producing a read signal;

an A/D converter for sampling said read signal every unit digit time duration, thereby forming reproduction sample values;

square error detecting means for obtaining square errors between said reproduction sample values and a plurality of predetermined predicted sample values; and pattern selecting means for so selecting a data pattern as said reproduction digital data that an accumulated addition value of the square errors obtained by said square error detecting means becomes minimum, wherein when assuming that a code series pattern which said original digital data signal can take is represented by ak=[a(k), a(k+1), ..., a(k+n)] (both of k and n denote natural numbers) and said predicted values are expressed by y(ak) in correspondence to ak, the following equation stands:

$$y(\underline{ak}) = \sum_{i=0}^{n} h(i)a(k+n-i)$$

where, said h(i) denotes tap coefficients of a digital filter which are obtained by performing the discrete inverse Fourier transformation on frequency characteristics of a recording and reproducing system constructed by said recording medium and said reading device.

2. An apparatus according to claim 1, wherein said recording medium is an optical disk and said reading device is an optical disk player.

3. An apparatus according to claim 1 or 2, wherein $h_0(j)$ is smaller than a binomial coefficient nCj, where h(i)=h(n−i) (where, i is an integer which satisfies 0≦i≦n) is satisfied with respect to said tap coefficients h(i) and normalized tap coefficients obtained by dividing said tap coefficients h(i) by h(0) =h(n) are represented by [1, $h_0(1)$, ..., $h_0(j)$, ..., 1].

4. An apparatus according to claim 1 or 2, wherein said predicted values have values which are distributed to positive and negative values and a ratio between a minimum absolute value and a maximum absolute value among the predicted values excluding 0 is smaller than a ratio between a minimum absolute value and a maximum absolute value among predicted values excluding 0 in a PRML system.

5. An apparatus according to claim 4, wherein a minimum inversion interval of said original digital data signal is equal to a period of one symbol, said predicted values have values which are distributed to positive and negative values, and the ratio between the minimum absolute value and the maximum absolute value among the predicted values excluding 0 is smaller than ¼.

6. An apparatus according to claim 4, wherein a minimum inversion interval of said original digital data signal is equal to a period of two symbols, said predicted values have values which are distributed to positive and negative values, and the ratio between the minimum absolute value and the maximum absolute value among the predicted values excluding 0 is smaller than ½.

7. An apparatus according to claim 4, wherein a minimum inversion interval of said original digital data signal is equal to a period of three symbols, said predicted values have four values which are distributed to positive and negative values and the ratio between the minimum absolute value and the maximum absolute value among the predicted values is smaller than ½.

8. An apparatus according to claim 4, wherein a minimum inversion interval of said original digital data signal is equal to a period of three symbols, said predicted values have five values which are distributed to positive and negative values and the ratio between the minimum absolute value and the maximum absolute value among the predicted values excluding 0 is smaller than ¾.

* * * * *